E. STEVENS.
EVAPORATOR.
APPLICATION FILED AUG. 1, 1917.
1,300,670.
Patented Apr. 15, 1919.
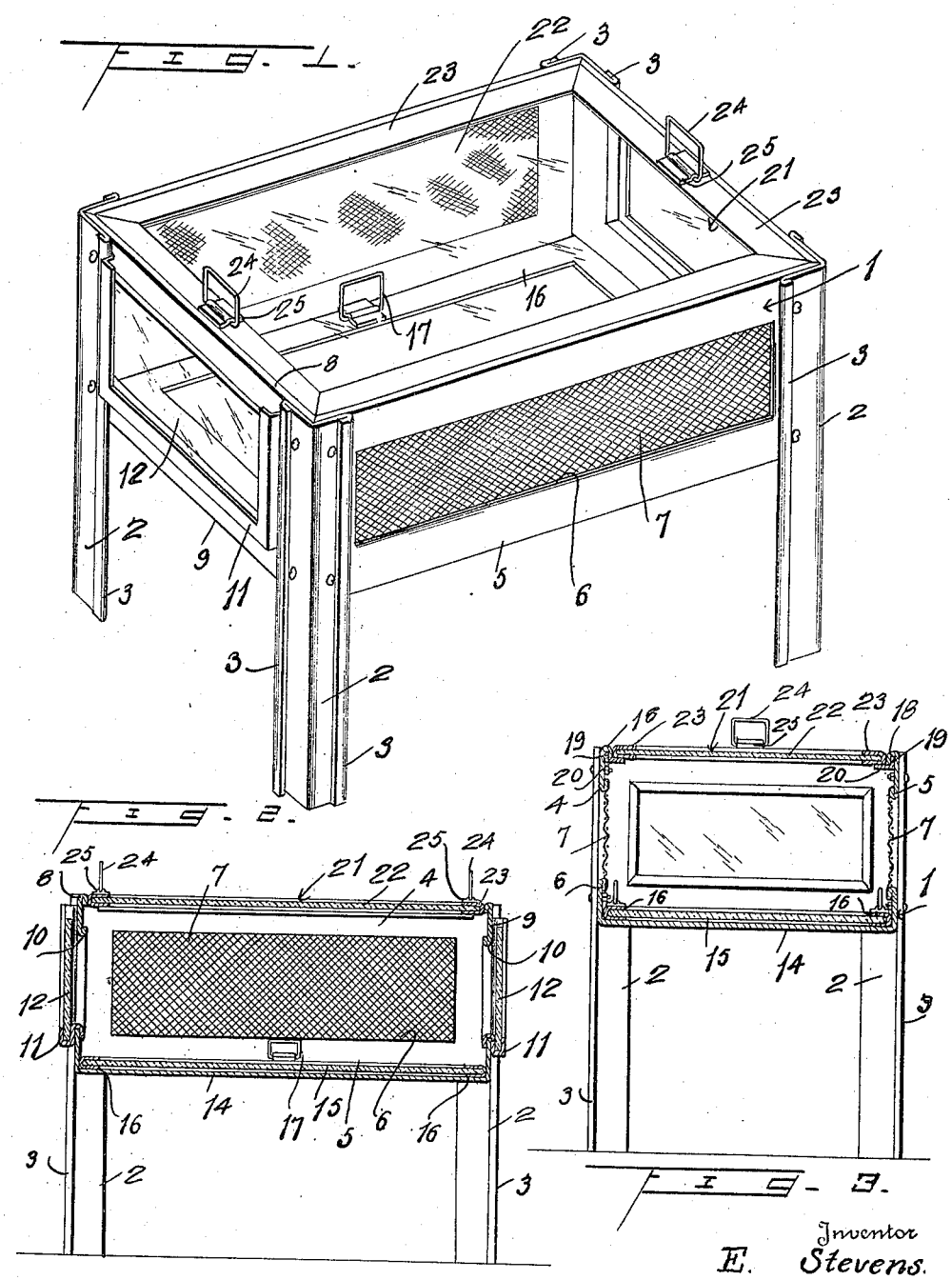
Inventor
E. Stevens.

UNITED STATES PATENT OFFICE.

ESTHER STEVENS, OF LA HARPE, ILLINOIS.

EVAPORATOR.

1,300,670.  Specification of Letters Patent.  Patented Apr. 15, 1919.

Application filed August 1, 1917. Serial No. 183,884.

*To all whom it may concern:*

Be it known that I, ESTHER STEVENS, a citizen of the United States, residing at La Harpe, in the county of Hancock and State of Illinois, have invented certain new and useful Improvements in Evaporators; and I do hereby declare the following to be a full, clear, and exact description of the invention, such as will enable others skilled in the art to which it appertains to make and use the same.

This invention relates to an evaporator, to be used for drying various types of fruit, such as apples, peaches, or the like, drying vegetables or the like and the primary object of the invention is to provide an evaporator structure which will evaporate the moisture from the fruit, in a very short time, and one which will protect the drying fruit or preserves from insects, such as flies, gnats or the like.

More specifically, the evaporator comprises a rectangular body which has suitable supporting legs carried thereby, the sides of which body are provided with openings that are screened by screens having very fine mesh, so as to prevent gnats from passing therethrough and the ends of which are closed by sliding transparent panels of glass. The top of the rectangular body of the evaporator is constructed to provide a pair of oppositely disposed inwardly extending flanges, that extend along the inner edges of the side of the body and form supports for the top of the evaporator, which is constructed of glass so that the rays of the sun will be directed upon the fruit for evaporating the same.

A further object of this invention is to provide a removable glass plate which is mounted within the bottom of the main body of the evaporator and upon which the fruit or vegetables to be dried are placed, so that the sun will be reflected upon the drying fruit or vegetables, and the heat of the sun's rays reflected from the bottom of the body to the fruit.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a perspective view of the improved evaporator,

Fig. 2 is a longitudinal section through the evaporator, and

Fig. 3 is a cross section through the evaporator.

Referring more particularly to the drawings, 1 indicates the main or rectangular body of the evaporator which has a plurality of legs 2, one of which is attached to each corner of the rectangular body 1. The legs 2 are constructed of angled sheet metal which have their edges rolled as indicated at 3, to prevent the formation of sharp edges along the legs. The sides 4 and 5 of the rectangular body 1 are provided with longitudinally extending openings 6 which are screened by screens 7. The screens 7 have very fine mesh, so as to prevent gnats or similar small insects from passing through the screens 7 into the interior of the main body 1.

The ends 8 and 9 of the body 1 are also provided with openings 10 and the outer surfaces of the ends 8 and 9 of the body 1 have angled plates 11 attached thereto which extend along both ends and the lower edge of the openings, forming guides and supports for removable transparent panels 12 which are constructed of glass.

The bottom 14 of the body 1 is constructed of sheet metal, as are also the sides and ends of the same, and a tray or plate 15 is positioned within the main body 1 and rests upon the bottom 14. The tray or plate 15 is constructed of glass, of the ordinary transparent type, and its edges are bound by strips of flat metal, as shown at 16. The binding strips 16 engaging the inner surface of the bottom 14 will hold the glass tray or plate 15 spaced slightly from the inner surface of the bottom 14, as clearly shown in Figs. 2 and 3 of the drawings. The plate or tray 15 has handles 17 pivotally connected thereto, by means of which handles the tray or plate may be lifted from the interior of the body 1.

The upper edges of the sides 4 and 5 of the body are bent inwardly and downwardly as shown at 18 and overlap the vertical portions 19 of angled plates 20. The horizontal portion of the angled plates 20 form supports for the top or cover 21 of the evaporator. The top or cover 21 of the evaporator is constructed of a plate of transparent glass 22, the edges of which are bound by metallic binding strips 23. The top 21 has handles 24 attached to the end of the same, which handles are constructed of rods or wires bent to form a rectangular shape and attached to the upper outer surfaces of the binding strips 23 at the ends of the plate 22 by metallic straps 25 which allow pivotal movement of the handles 24. The handles 17 which are attached to the bottom plate 15 are identical in construction to the handles 24.

The transparent glass plates 22 will direct the rays of the sun upon the fruit positioned upon the tray or plate 15, and consequently facilitate the evaporation of the moisture from the fruit being dried. It is desirable to have the inner surface of the bottom 14 bright so that it will reflect the sun's rays upwardly through the transparent plate 15 and cause the reflected sun's rays to strike the fruit or vegetables from beneath, also facilitating the drying of the fruit or vegetables.

If it is so desired, the improved evaporator may be employed as a retainer for seed boxes in the spring, in which boxes the various types of seeds have been planted.

The screened openings 6 will permit of the ventilation of the interior of the body 1 and allow the steam or evaporated moisture to pass out of the body 1.

In reducing the invention to practice, certain minor features of construction, combination and arrangement of parts may necessitate alterations to which the patentee is entitled, provided such alterations are comprehended within the scope of what is claimed.

What is claimed is:—

1. In an evaporator, a substantially rectangular body having a solid bottom, a transparent tray resting upon said solid bottom, and a transparent tray removably supported at the upper edge of the body for forming a cover therefor.

2. In an evaporator, a substantially rectangular body having openings formed in its sides and ends, the openings formed in the sides being screened by fine mesh screen wire, removable transparent plates forming closures for the openings in the ends of the body, horizontal inwardly extending flanges carried near the upper edge of the sides of said body, and a transparent cover plate mounted upon said flanges.

3. In an evaporator, a substantially rectangular body having openings formed in its sides and ends, the openings formed in the sides being screened by fine mesh screen wire, removable transparent plates forming closures for the openings in the ends of the body, horizontal inwardly extending flanges carried near the upper edge of the sides of said body, a transparent cover plate mounted upon said flanges, a transparent tray mounted within said body and resting upon the bottom of the same.

4. In an evaporator, a rectangular body having openings formed in its sides and ends, screen wire of fine mesh extending over the openings formed in the sides of said body, guides carried by the outer surfaces of the ends of said body, glass plates removably supported by said guides, a glass tray positioned within said body and resting upon the bottom of the same, horizontal inwardly extending flanges carried by the sides of the body adjacent their upper edges, a glass cover plate removably mounted upon said flanges and forming a closure for the open top of the body, said glass tray and cover plate having their edges bound with metallic binding strips.

In testimony whereof I affix my signature in presence of two witnesses.

ESTHER STEVENS.

Witnesses:
G. L. INGRAHAM,
J. R. BOOTH.

Copies of this patent may be obtained for five cents each, by addressing the "Commissioner of Patents, Washington, D. C."